(12) United States Patent
Lemberg et al.

(10) Patent No.: US 11,052,782 B1
(45) Date of Patent: Jul. 6, 2021

(54) ONBOARD FIELD WEAKENED AC CHARGER

(71) Applicant: BAE Systems Controls Inc., Endicott, NY (US)

(72) Inventors: Nicholas A. Lemberg, Endwell, NY (US); Peter A. Carruthers, Ithaca, NY (US)

(73) Assignee: BAE Systems Controls Inc., Endicott, NY (US)

( * ) Notice: Subject to any disclaimer, the term of this patent is extended or adjusted under 35 U.S.C. 154(b) by 0 days.

(21) Appl. No.: 17/041,167

(22) PCT Filed: Apr. 10, 2020

(86) PCT No.: PCT/US2020/027781
§ 371 (c)(1),
(2) Date: Sep. 24, 2020

(51) Int. Cl.
*B60L 53/62* (2019.01)
*H02J 7/00* (2006.01)
*B60L 53/50* (2019.01)
*H02J 7/04* (2006.01)

(52) U.S. Cl.
CPC .............. *B60L 53/62* (2019.02); *B60L 53/50* (2019.02); *H02J 7/04* (2013.01); *H02J 2207/20* (2020.01)

(58) Field of Classification Search
CPC ...... B60L 53/50; B60L 53/62; B60L 2210/30; H02J 7/02; H02J 7/04; H02J 2207/20
See application file for complete search history.

(56) References Cited

U.S. PATENT DOCUMENTS

| | | | |
|---|---|---|---|
| 2005/0269999 A1 | 12/2005 | Liu et al. | |
| 2008/0094013 A1 | 4/2008 | Su | |
| 2012/0019212 A1 | 1/2012 | Krauer | |
| 2015/0311739 A1* | 10/2015 | Schillinger | H02M 1/4216 320/107 |
| 2016/0329851 A1* | 11/2016 | Borisov | H02M 1/4216 |
| 2017/0294853 A1* | 10/2017 | Flannery | H02M 7/483 |
| 2018/0175742 A1* | 6/2018 | Lapassat | H02M 7/493 |

FOREIGN PATENT DOCUMENTS

WO   2013100559 A1   7/2013

OTHER PUBLICATIONS

International Search Report, PCT/20/27781, dated Jul. 6, 2020, 8 pages.

* cited by examiner

*Primary Examiner* — Richard Isla
*Assistant Examiner* — Johali A Torres Ruiz
(74) *Attorney, Agent, or Firm* — Scott J. Asmus; Scully Scott Murphy & Presser PC (57) ABSTRACT

A charging system for a vehicle is provided. The charging system is for charging an energy storage system of the vehicle using grid power. The grid power may be an external three-phase AC. The charging system may use field weakening techniques to reduce a peak line-line voltage detected at input terminals of conversion circuitry when a need is determined.

18 Claims, 7 Drawing Sheets

Fig. 7

ONBOARD FIELD WEAKENED AC CHARGER

FIELD OF THE DISCLOSURE

This disclosure relates to chargers for an energy storage system from a three-phase AC power source. More particularly, this disclosure relates to charging an energy storage system in a vehicle from an external three-phase AC power source.

BACKGROUND

Hybrid electric vehicles and electric vehicles have energy storage systems. These systems may be charged using power from an external power source. For example, the energy storage system may be charged using power from a three-phase AC power grid. However, there can be a problem where a passively rectified grid voltage overlaps with the energy storage system voltage range (VL-LRMS*sqrt(2) >Vbattery_min). There are many different types of chargers including chargers that employ a boost rectification. Ideally for boost rectifier operation when in a non-isolated configuration, the rectified grid voltage is less than the battery voltage in all states. When the passively rectified grid voltage is higher than the current voltage of the energy storage device, the conversion circuitry may operate like a diode (passive) rectifier and could damage the energy storage system or overcharge the same.

One known charging system solves this by using an isolated converter. However, isolated converters are typically less efficient than non-isolated converters. Isolated converters are also typically more costly and complex.

SUMMARY

Accordingly, disclosed is a charging system for a vehicle. The vehicle may be a hybrid electric vehicle. In other aspects, the vehicle may be an electric vehicle. When in use, the charging system is coupled to an external three-phase AC power source and used to charge an energy storage system in the vehicle.

The charging system may comprise one or more switches for the AC power source, an AC filter, conversion circuitry, voltage sensors, one or more switches for the energy storage system, and a processor.

The AC filters may comprise an inductor. Each AC filter may be coupled to the three-phases of the AC power source, respectively.

The conversion circuitry may be coupled to the inductor of each AC filter. The conversion circuitry may be configured to convert three-phase AC power received at its input terminals into DC power for a system DC bus and may be configured to supply an independently controllable real AC current and reactive AC current. The voltage sensors may detect a voltage at each of the three-phases at the input terminals of the conversion circuitry.

The energy storage system may be connected to or isolated from the system DC bus via the one or more switches under the control of the processor. The one or more switches may be external to the energy storage system. In other aspects, the one or more switches may be incorporated into the energy storage system.

The processor may be configured to close the one or more switches associated with each of the three-phases when a condition is satisfied, determine a peak line-line voltage corresponding to the detected voltage at the input terminals of the conversion circuitry; and compare the determined peak line-line voltage with a real time voltage of the energy storage system to be charged.

When the determined peak line-line voltage is larger than or equal to the real time voltage of the energy storage system, the processor may be configured to calculate the reactive AC current to reduce the peak line-line voltage at the input terminals of the conversion circuitry to less than the real time voltage of the energy storage system, and cause the reactive AC current to be supplied by the conversion circuitry such that it flows through each inductor. This reduces the peak line-line voltage at the input terminals of the conversion circuitry.

The processor may also be configured to regulate the system DC bus to substantially match the real time voltage of the energy storage system and control the one or more switches associated with the energy storage system to close once the peak line-line voltage is less than the real time voltage of the energy storage system and the system DC bus voltage substantially matches the real time voltage of the energy storage system.

The processor may also be configured to control the charging of the energy storage system. In some aspects, the processor may be configured to control the real AC current to charge the energy storage system. In other aspects, the processor may be configured to regulate the system DC bus voltage to charge the energy storage system.

The reactive current may be calculated via an opened or closed control loop and may be continuously adjusted.

In some aspects, the reactive AC current is calculated based on the following equation:

$$Id = \frac{-Vac}{\omega eLs} + \sqrt{\frac{(Vess - Vm)^2}{3Ls^2\omega e^2} - Iq^2},$$

where Vac is a peak-line neutral voltage of the three-phase power source, ωe is the frequency of the three-phase power source, Ls is the inductance of inductor, Vess is the real time voltage of the energy storage system and Vm is the voltage margin, Id is the reactive AC current and Iq is the real AC current.

In some aspects, the reactive current may be calculated such that the peak line-line voltage is a predetermined value less than the real time voltage of the energy storage system.

When entering a charge mode (e.g., in response to a receipt of a signal), the processor may be configured to open the one or more switches associated with the energy storage system when receiving the signal from another controller or the energy storage system to charge the energy storage system to isolate the energy storage system from the system DC bus.

In some aspects, the processor may be configured to control at least one of the real AC current and real voltage Vq to regulate the system DC bus to substantially match the voltage of the energy storage system prior to closing the one or more switches associated with the energy storage system.

In some aspects, the processor is configured to cause reactive AC current by injecting the reactive AC current through each inductor of each AC filter causing field weakening.

DETAILED DESCRIPTION

For purpose of this description, the control is a variant of the classic permanent magnet machine vector control. The basic equations are:

$$Vq = Vac + IqRs + Id\omega eLs \quad (1)$$

$$Vd = IdRs - Iq\omega eLs \quad (2)$$

$$P = \frac{3}{2}(VdId + VqIq) \quad (3)$$

All variables are peak line-neutral. Id is defined as the reactive current into the grid and Iq is defined as the real current. Vac is the peak line-neutral voltage at the grid, which is in phase with the q axis. Vd and Vq are in phase with Id and Iq respectively, and represent peak line-neutral voltages at the power converter terminals. Rs is the resistive component of the filter and grid impedance and Ls the reactive component. ωe is the grid frequency in radians/second. P is the power transferred to the Energy storage system; negative Iq is required to transfer power from the grid to the energy storage system.

Figure 1:
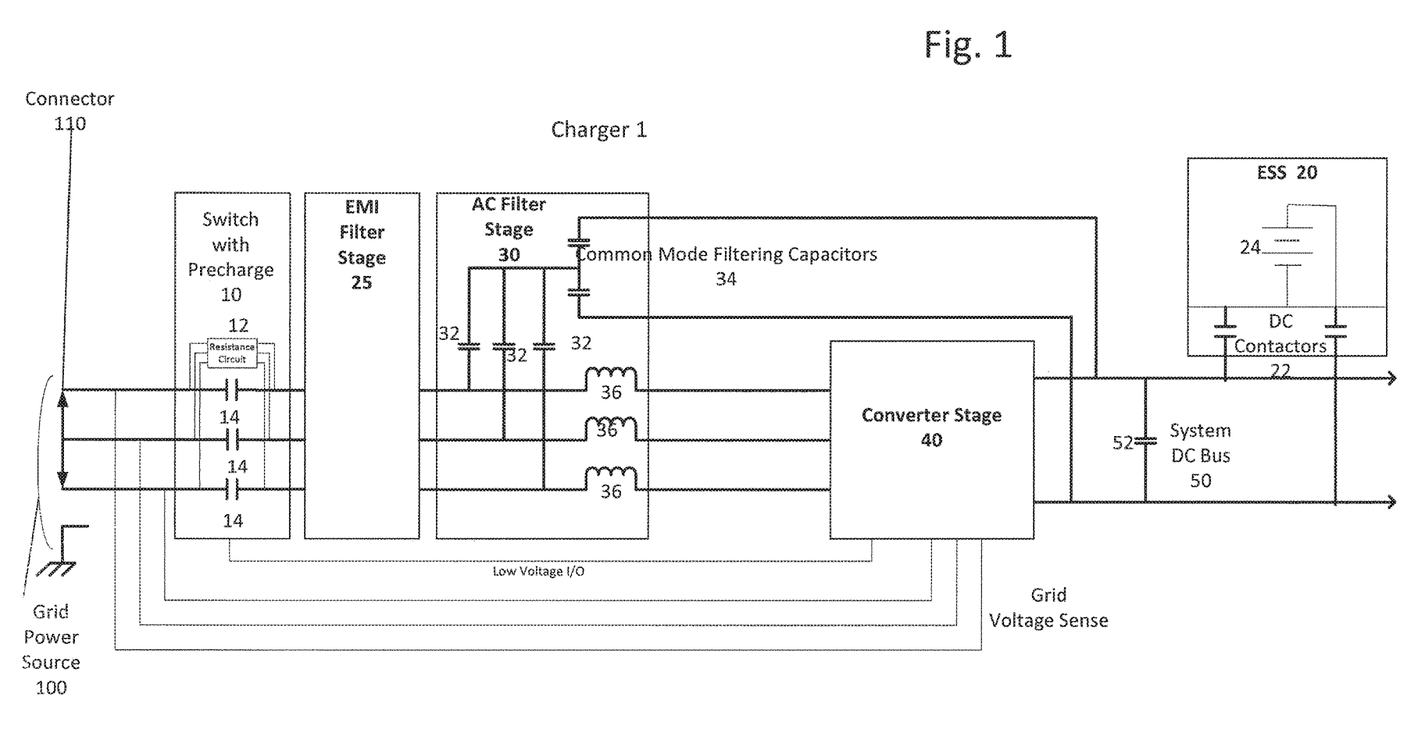
FIG. 1 is a diagram of a charging system in accordance with aspects of the disclosure for charging an energy storage system and the energy storage system.

FIG. 1 shows a schematic diagram of a charging system (also referred to herein as charger 1) for charging an energy storage system (ESS) 20 using an external power source, e.g., grid power source 100. In an aspect of the disclosure, the charger 1 is installed in a vehicle (onboard), such as an electric vehicle or a hybrid electric vehicle. The term vehicle used herein means a car, bus, taxi, vessel, airplane, UAV, UUV, train, tank, truck, or helicopter. The hybrid electric vehicle may be in a series hybrid configuration or a parallel hybrid configuration. In an aspect of the disclosure, the ESS 20 may be a high voltage energy storage. High used herein means a voltage above 50V. The ESS 20 may be used for power for propulsion.

In other aspects of the disclosure, the ESS 20 may be an accessory battery and used for powering AC and DC accessories.

In an aspect of the disclosure, the charger 1 is configured as a single stage non-isolated converter. This saves the design time of creating an isolated converter and is more efficient because of the single stage of the power conversion.

FIG. 1 does not show components of the vehicle other than the charger 1 and ESS 20. However, certain other components of the vehicle may also be coupled to the charger 1 and/or ESS 20. For example, in a case of a hybrid electric vehicle, the vehicle would have a prime mover, such as an engine or fuel cell. The engine may use gasoline, or the engine may be a diesel engine or a compressed natural gas (CNG) engine. A generator would be mechanically connected or coupled to the engine, such as via a shaft, belt/pulley system, gearbox, etc.

When coupled to the engine (referred to herein as the genset), the generator provides three-phase AC electrical power and may be a high voltage generator. The generator may also be electrically coupled to a converter stage 40 (such as the converter stage shown in FIG. 1). Thus, the generator, via the converter stage 40, also supplies power to the System DC bus 50 (DC Link) and ESS 20. In other aspects of the disclosure, a separate converter stage may be used for the generator (other than the converter stage in the charger 1).

The System DC bus 50 may be connected to another converter stage for converting the system DC bus 50 to AC for an AC traction motor. The System DC bus 50 supplies power to the AC traction motor via the another converter stage. The traction motor in turn may be mechanically connected to a transmission system, axle(s) and wheels. The type of components in the vehicle (such as for propulsion) may depend on the type of vehicle. For example, an airplane and train would have different components than a bus.

The vehicle may also have one or more control systems. One of the control systems may be used for controlling the propulsion of the vehicle. For example, there is a control system which receives operator commands via the user interfaces, e.g., gas pedal and brake, and generates torque and/or power commands for the converters and generator (coupled to the engine in a case the vehicle is a hybrid electric vehicle).

This control system may also be in communication with the ESS 20 via a control area network (CAN).

The grid power source 100 may be a utility grid. In an aspect of the disclosure, the grid power source 100 provides three-phases. For example, the grid power source 100 may provide 400V at 50 Hz. The value and frequency of the source is provided, only by way of example, and other voltages and frequencies may be used. The grid power source 100 may be a dedicated vehicle charging station. In other aspects of the disclosure, the power source 100 may be an external generator, building local high voltage junction box, or shore power.

In an aspect of the disclosure, the charger 1 may be coupled to the grid power source 100 using a connector 110. The connector 110 may be a connection system with High Voltage Interlock Loop (HVIL). The connector 110 may also have Electromagnetic Interface Shielding (EMI) for noise reduction. The connector 110 includes a ground wire.

The charger 1 may comprise a switch with precharge (shown schematically in FIG. 1 and identified as "10"). Each phase line has a AC switch. In some aspects, the AC switch(es) 14 may be a relay (an electrically operated switch). For high power applications, the relay may be a contactor. In other aspects of the disclosure, the switches may be semiconductor based, such as a MOSFET. In other aspects of the disclosure, a mechanically operated switch may be used.

Figure 4:
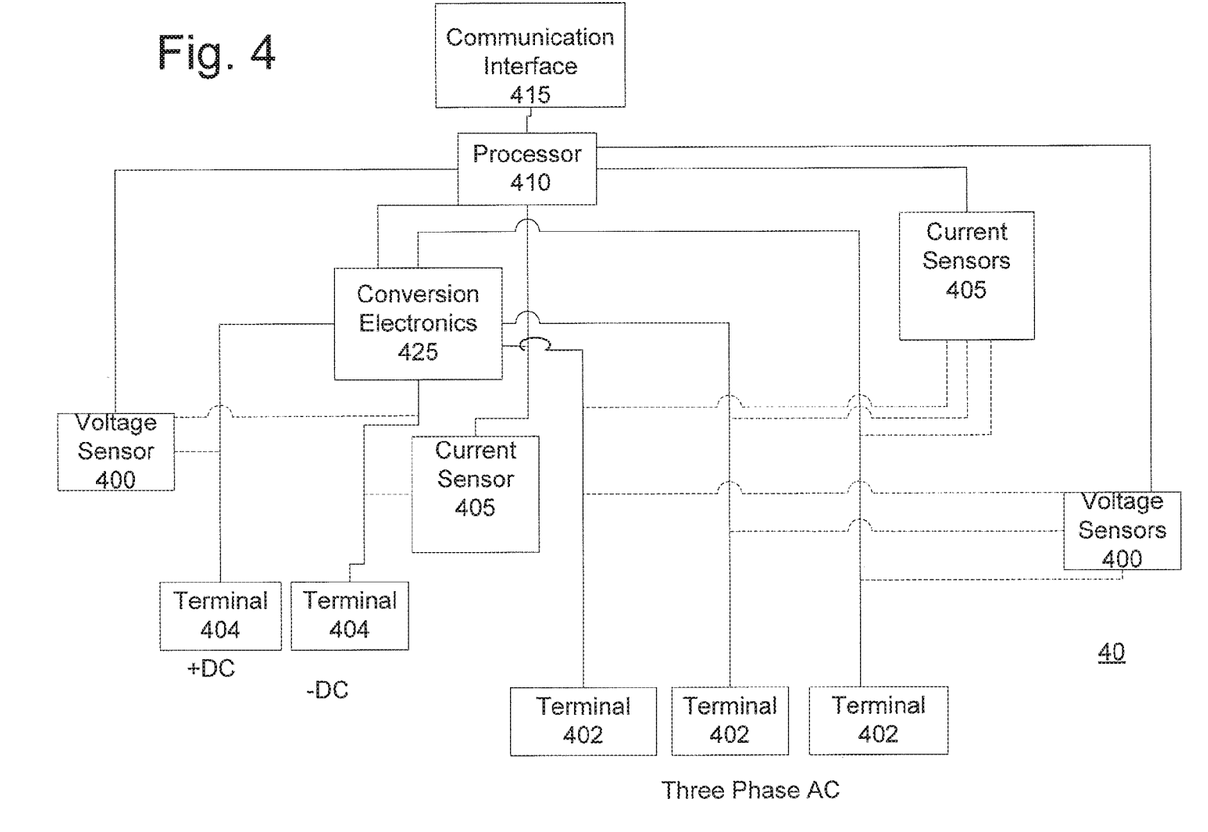
FIG. 4 is a diagram of the converter stage of FIG. 1 in accordance with aspects of the disclosure.

When the AC switch(es) 14 is closed, the grid power source 100 is electrically coupled with the converter stage input terminals (shown in FIG. 4 as terminal(s) 402). When the AC switch(es) 14 is open, the grid power source 100 is electrically isolated by the input terminals 402. In FIG. 1, three switch(es) 14 are shown (one for each line), however, in other aspects of the disclosure, a single switch may be used for all three-phases. In an aspect of the disclosure, a processor in the converter stage 40 (shown in FIG. 4 identified as "410") controls the switch(es) 14 (as shown in FIG. 1 by Low Voltage I/O).

The charger 1 may have inrush current protection (precharge). As shown in FIG. 1, resistance circuit 12 is placed in parallel with the switch(es) 14. In some aspects of the disclosure, the resistance circuit 12 comprises a resistor in series with a switch. The resistor may have a fixed value. A processor in the converter stage 40 may control the switch to close upon detection of the grid power source 100 (connection). Once the precharge current has effectively zeroed through the system, the processor 410 may open the switch (in series with the resistor). In other aspects, the resistance maybe provided by an NTC thermistor. The NTC thermistor may also be placed in series with the switch.

The charger 1 may also comprise an EMI Filter Stage 25 and an AC Filter Stage 30. The EMI Filter Stage 25 is also for reducing noise. The circuitry used for an EMI Filter Stage 25 is well known and a commercial off the shelf EMI filter may be used.

The AC Filter Stage 30 may comprise a LC circuit for each phase (capacitor 32 and inductor 36). As shown in FIG. 1, the AC Filter Stage 30 is configured in a common mode. The stage 30 also comprises common mode filtering capacitors 34. However, other configurations for the AC filter stage 30 are possible and the configuration of the stage 30 is not limited to the depicted configuration.

The charger 1 may also comprise a converter stage 40. A schematic diagram of the converter stage 40 is shown in FIG. 4.

As shown in FIG. 4, the converter stage 40 may comprise three input terminals 402, one input terminal for each phase. The converter stage 40 may comprise a voltage sensor 400 for each phase and a voltage sensor 400 for the DC link. The converter stage 40 may also have current sensors 405. In some aspects, there may be a current sensor for each phase as well. In other aspects of the disclosure, only two current sensors may be used for the AC link. As depicted, the voltage sensors 400 and current sensors 405 are located within the converter stage 40, however, in other aspects of the disclosure, the sensors 400/405 may be external to the converter stage 40. As depicted, there is a current sensor 405 for the −DC. However, in other aspects, the current sensor 405 may be on the +DC. Further, in other aspects, both the +DC and −DC may have current sensors 405.

In an aspect of the disclosure, the current sensors 405 may be hall effect sensors. In other aspects of the disclosure, a current sensing shunt resistor circuit may be used.

The converter stage 40 may also comprise a processor 410. The processor 410 is coupled to the voltage sensors 400 and current sensors 405. The processor 410 may be an FPGA. In other aspects of the disclosure, the processor 410 may be a microcontroller or microprocessor or any other processing hardware such as a CPU or GPU. Memory may be separate from the processor (as or integrated in the same). For example, the microcontroller or microprocessor includes at least one data storage device, such as, but not limited to, RAM, ROM and persistent storage. In an aspect of the disclosure, the processor may be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis.

The processor 410 receives the sensed voltage(s) and current(s) from the sensors and calculates certain values in accordance with aspects of the disclosure based thereon such as, but not limited to, a peak line-line voltage.

The converter stage 40 may also comprise conversion electronics 425 for converting AC into DC and vice versa under the control of the processor 410 and injecting a reactive current. The conversion electronics 425 may comprise switches such as MOSFETS for each phase. The processor 410 may function as a gate driver for the switches.

The converter stage 40 may also comprise output terminals 404 for the System DC bus 50 (one positive and one negative). In some aspects of the disclosure, the converter stage 40 may also comprise voltage sensors for detecting a grid voltage including phase (sensors not shown in FIG. 4). The voltage sensor may also be external to the converter stage 40.

The converter stage 40 may also comprise a communication interface 415. This interface 415 may be a CAN interface for communicating with other control systems in the vehicle such as the control system for propulsion control and for communicating with the ESS 20.

The ESS 20 provides a direct current (DC) electrical power to the System DC bus 50. The ESS 20 may include lithium ion batteries (shown as "24" in FIG. 1). In an aspect of the disclosure, the nominal voltage of the System DC bus 50 may be above 600V. A capacitance 52 is connected between the lines of the System DC bus 50.

The ESS 20 may also alternatively include ultra-capacitors, lead-acid batteries, and other energy storage mediums. The ultra-capacitor may include an electric double-layer capacitor (EDLC), also known as a supercapacitor, a supercondenser, or an electrochemical double layer capacitor, which has an electrochemical capacitor with relatively high energy density.

The ESS 20 may also comprise a switch(es) (e.g., DC contactors 22) for selectively electrically connecting/isolating the ESS 20 from/to the System DC Bus 50. In some aspects of the disclosure, the DC contactors 22 are controlled by the processor 410.

Figure 2:
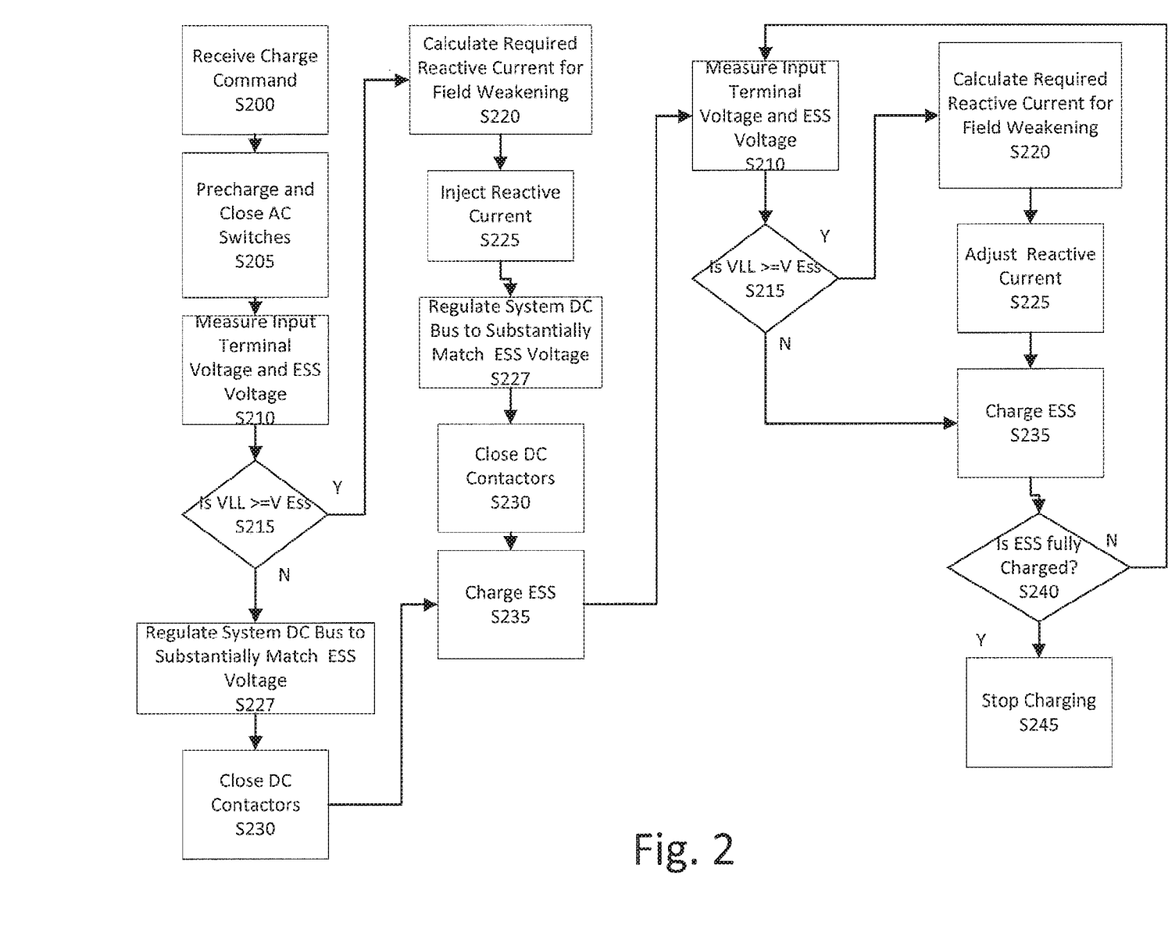
FIG. 2 is a flow diagram for charging an energy storage system using field weakening in accordance with aspects of the disclosure.

FIG. 2 illustrates a method of charging an ESS 20 in accordance with aspects of the disclosure. At S200, a charge command is received by the processor 410. In an aspect of the disclosure, the charge command may be received from the ESS 20. In this aspect of the disclosure, the ESS 20 may indicate to the processor 410 that the cells need to be charged. In another aspect of the disclosure, a control system, such as the system for controlling propulsion may issue a command or instruction to the processor 410 to charge the ESS 20. In other aspects of the disclosure, instead of receiving a command from another control system or the ESS 20, the processor 410 may detect a connection with the grid power source 100 and initiate a charging session. In accordance with this aspect, the grid voltage may be sensed by voltage sensors. In other aspects of the disclosure, the processor 410 may directly sense the voltage of the ESS 20. When the sensed voltage is below a preset threshold, the processor 410 may initiate the charging session. When a charging session is initiated, the processor 410 controls the DC contactors to open 22 (if closed) to isolate the ESS 20 from the system DC bus 50. This may be done using a low voltage control signal.

At S205, precharging occurs followed by the closing of the AC switch(es) 14 (and opening the switch in the resistance circuit 12). When a resistor is used for the precharging (inrush protection), the processor 410 closes the AC switch(es) 14 when a predetermined time has elapsed or once the precharge current has effectively zeroed in the system. The processor 410 issues a control signal to the switch(es) 14. In an aspect of the disclosure, the control signal is a low voltage control signal which actuates the switch(es) 14 (shown in FIG. 1 as "Low Voltage I/O"). In other aspects of the disclosure, where a resistor in series with a switch is used as the precharging, the processor 410 will also control the switch (in series with the resistor) to close when the charge command is received and open after a predetermined time or current flow. Subsequently, the processor 410 will control the switch(es) 14 as described above.

At this point in time, the ESS 20 is electrically isolated from the System DC Bus 50, e.g., DC contactors 22 are open.

At S210, the voltages at each input terminal are sensed via the voltage sensors 420, e.g., localized voltage. Also, the voltage of the ESS 20 is determined. In an aspect of the disclosure, the processor 410 may directly measure the voltage of the ESS 20 via a sensor. In other aspects of the disclosure, the processor 410 receives a real time voltage of the ESS 20 from the ESS 20 via CAN.

Using the real time voltage of the ESS 20 and the sensed voltages at the terminals 402, the processor 410 determines whether field weakening is needed at S215. The processor 410 may convert the voltages detected at each terminal into a dq space, e.g., Vd and Vq voltage. Once converted, the processor 410 determines the total localized voltage Vs at the converter terminals using the following equation:

$$Vs = \sqrt{Vq^2 + Vd^2} \tag{4}$$

Based on total Vs, the processor then determines the peak line-line voltage VLL. In other aspects of the disclosure, instead of converting the sensed phase voltage into Vd and Vq, the processor 410 may calculate the VLL directly from the phase voltage.

The processor 410 compares the peak line-line voltage VLL with the real time ESS voltage. When the peak-line-line voltage VLL is greater than or equal to the real time voltage of the ESS, the processor 410 may determine that field weakening is needed ("Y" at S215). On the other hand, when the peak line-line voltage VLL is less than the real time voltage of the ESS, field weakening is not needed and S220 and S225 are skipped ("N" at S215).

In other aspects of the disclosure, a voltage margin VM may also be used. The voltage margin may account for deadtime, controls, switching drop, etc. In this case, when the peak line-line voltage VLL is greater than the real time voltage of the ESS minus VM, the processor 410 determines that field weakened is needed.

At S220, the processor 410 determines the amount of field weakening. Field weakening is achieved by injecting a reactive current Id such that it flows through each inductor 36. This reduces the peak line-line voltage at the input terminals 402. In an aspect of the disclosure, the reactive current Id is determined by the following equation:

$$Id = \frac{-Vac}{\omega eLs} + \sqrt{\frac{(Vess)^2}{3Ls^2 \omega e^2} - Iq^2} \tag{5}$$

where Vac is the peak-line neutral voltage of the grid power source 100, ωe is the frequency of the voltage of the grid power source 100, Ls is the inductance of inductor 36, and Vess is the real time voltage of the ESS. When a voltage margin is used, Id is calculated with the following equation:

$$Id = \frac{-Vac}{\omega eLs} + \sqrt{\frac{(Vess - Vm)^2}{3Ls^2 \omega e^2} - Iq^2} \tag{6}$$

where Vac is the peak-line neutral voltage of the grid power source 100, ωe is the frequency of the voltage of the grid power source 100, Ls is the inductance of inductor 36, Vess is the real time voltage of the ESS and Vm is the voltage margin.

When Id is less than zero, field weakening will occur. The more negative Id is, the stronger the field weakening will be.

Figure 5:
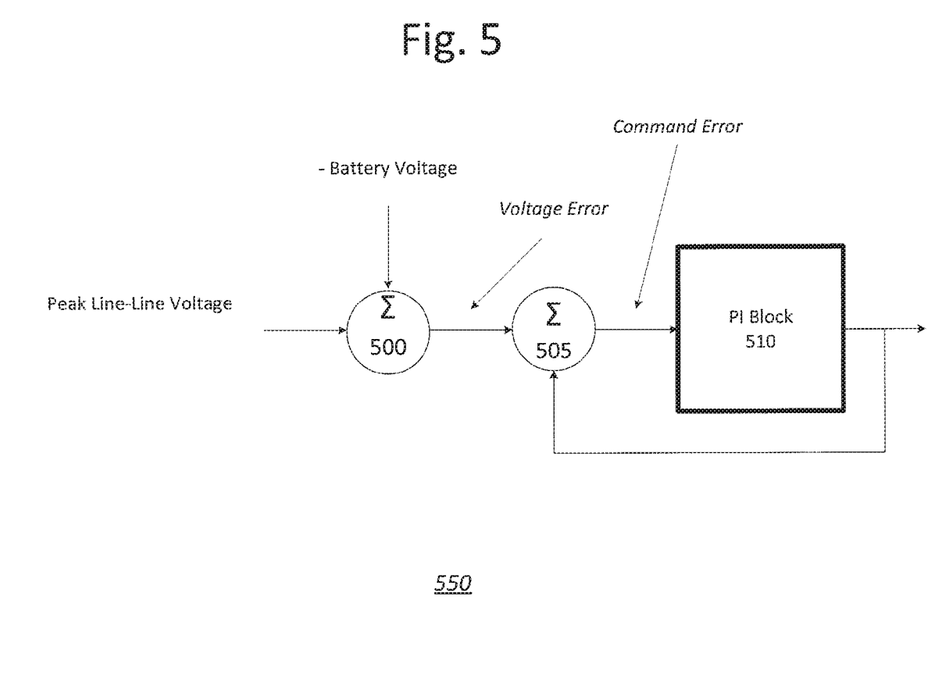
FIG. 5 is a diagram of a PI controller used for determining a reactive current for field weakening in accordance with aspects of the disclosure.

In other aspects of the disclosure, the reactive current Id, will be determined via a PI controller (shown in FIG. 5).

At S225, once the reactive current Id is determined, the processor 410 will cause the same to be injected to flow through the inductors 36. For example, the processor 410 will control the conversion electronics 425 to provide the determined reactive current Id. For example, the processor 410 may control the gates of the respective switches such that the switches open and close as appropriate.

Figure 6:
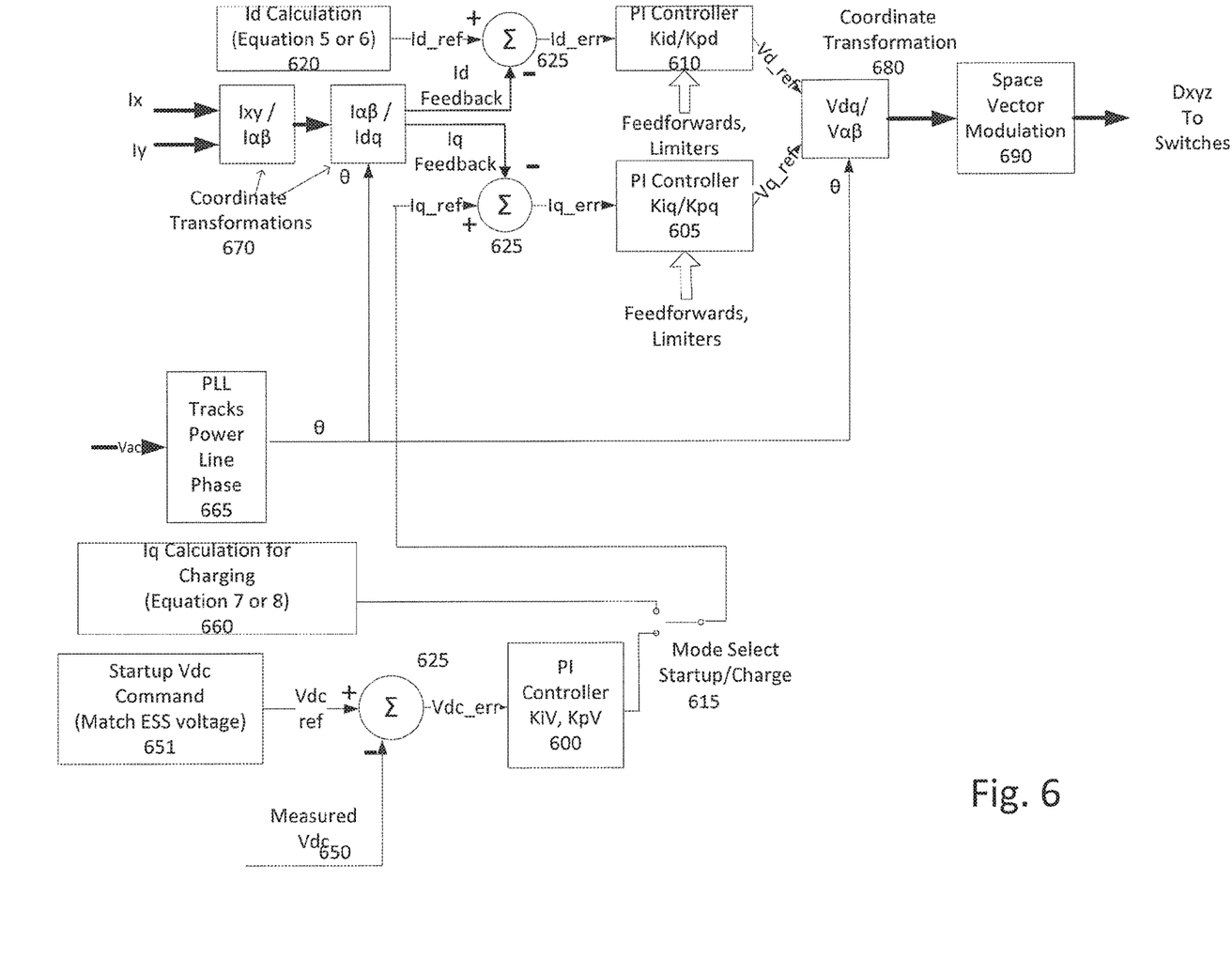
FIG. 6 is a diagram shown an example of the control for field weakening, system DC bus voltage regulation and charging the energy storage system in accordance with aspects of the disclosure.

One example of the control is shown in FIG. 6. As shown in FIG. 6, the processor 410 may execute a plurality of PI controls (including PI controller 610).

The processor 410 uses the current Ix and Iy, sensed by the current sensors 405, and converts the same into Id and Iq (Id feedback and Iq feedback, respectively) via coordinate transformation 670. The transformation has two portions Ixy to Iαβ and then Iαβ to Idq.

The phase θ and voltage of the grid power source 100 determined by a phase lock loop PLL 665. In one aspect of the disclosure, voltage sensors 400 in the converter stage 40, may detect the voltage and phase θ. In other aspects of the disclosure, the voltage may be detected by an observer.

The PLL outputs the phase θ to the transformation. The phase θ is used in the transformation from Iαβ to Idq.

The calculated reactive current Id based on the above equation (referenced in FIG. 6 as "620") (or based on PI control) is supplied as a Id_ref to adder 625, which obtains the difference between Id feedback and the determined reactive current Id. This difference is an Id_err (the error signal). The PI controller 610 outputs a reference voltage Vd_Ref which causes the measured value to reach the set point (determined reactive current Id). The gains Kid and Kpd are selected based on stability constraints and a desired convergence time. As shown in FIG. 6, feed forwards values are input into the PI controller 610. This is to decouple a cross coupling between the d-axis and the q-axis. The PI controllers also contain voltage vector limiters which prevent the peak line-line value of Vs from exceeding System DC bus 50.

The Vd command to the space vector modulation 690 is generated by transforming the output from the PI controller 610 (Vd_Ref) from Vdq to Vαβ. This transformation also uses the phase θ of the grid power source 100.

The output of the space vector modulation controls the conversion electronics 425.

Prior to closing the DC contactors 22 and charging the ESS 20, the processor 410 regulates the System DC bus 50 to match the real time ESS voltage at S227.

An example of the voltage regulation is also shown in FIG. 6. The regulation is performed by a PI controller 600 (implemented by processor 410) in combination with other PI controllers. Here the set point is a Vdc command to match the real time voltage of the ESS (set point is shown as Vdc ref). A measured value (measured Vdc 650) is subtracted from Vdc ref to generate the error, e.g., Vdc_err in adder 625. The PI controller 600 outputs a Iq_Ref which causes the measured value to reach the set point. The gains KiV and KpV are selected based on stability constraints and a desired convergence time. At this time, the "mode" is set to startup, meaning that the charger 1 is not charging the ESS 20. As shown in FIG. 6, the mode includes startup and charge. Charge mode is where the ESS 20 is being charged by the charger 1.

In startup mode, Iq_ref is set by the PI controller 600 (in charge mode, Iq_ref is set based on the desired charge as described from equations 7 or 8).

Additionally, Iq_feedback is subtracted from Iq_ref to generate the error, e.g., Iq_err in adder 625. The PI controller 605 outputs a Vq_Ref. The gains Kiq and Kpq are selected based on stability constraints and a desired convergence time. Similar feedforward values and limiters are input to the PI controller 605 (as PI controller 610) which serve the above described functions.

The Vq command to the space vector modulation 690 is generated by transforming the output from the PI controller 605 (Vq_Ref) from Vdq to Vαβ. This transformation also uses the phase θ of the grid power source 100.

The output of the space vector modulation controls the conversion electronics 425 (e.g., switches).

Once the voltage of the system DC bus 50 is regulated to the real time ESS voltage and the reactive current Id is injected, the processor 410 closes the DC contactors 22 (at S230). The processor 410 may control the DC contactors 22 in a similar manner as described above with a low voltage control signal.

Subsequently, the ESS 20 is charged by the charger 1 at S235. Since as a result of the field weakening, the localized voltage (voltage at the terminals) is less than the real time voltage of the ESS, the converter stage 40 may act as a boost converter (boost rectifier) and step up the voltage. In particular, the field weakening is applied against the inductors 36 and there is a region between the AC filter stage 30 and the converter having a localized voltage reduction (as a result of the field weakening).

In an aspect of the disclosure, the processor 410 via CAN receives a request for a specific power from the ESS 20. The processor 410 controls the conversion electronics 425 based on this request. In an aspect of the disclosure, the processor 410 calculates Iq needed to satisfy this request based on the following equation:

$$Iq = -\frac{2P}{3Vac} \quad (7)$$

where P is the requested power and Vac is the peak line-neutral voltage of the grid power source 100.

In an aspect of the disclosure, the processor 410 via CAN receives a request for a specific current from the ESS 20. The processor 410 controls the conversion electronics 425 based on this request. In an aspect of the disclosure, the processor 410 calculates Iq needed to satisfy this request based on the following equation:

$$Iq = -\frac{2IdcVess}{3Vac} \quad (8)$$

where Idc is the requested current, Vess is the real time ESS voltage, and Vac is the peak line-neutral voltage of the grid power source 100.

FIG. 6 also shows an example of a control for charging the ESS 20. As shown in FIG. 6, the Mode Select Startup/Charge 615 would be set to "Charge" (as depicted in FIG. 6, no mode is set). In "charge", the calculated Iq (based on either equation 7 or 8) would be set as the Iq_ref (set point). The Iq_feedback would be subtracted by adder 625 to generate the error, e.g., Iq_err. The PI controller 605 outputs a Vq_Ref. As described above, the gains Kiq and Kpq are selected based on stability constraints and a desired convergence time.

The Vq command to the space vector modulation 690 is generated by transforming the output from the PI controller 605 (Vq_Ref) from Vdq to Vαβ. This transformation also uses the phase θ of the grid power source 100. The output of the space vector modulation controls the conversion electronics 425 (e.g., switches).

Figure 7:
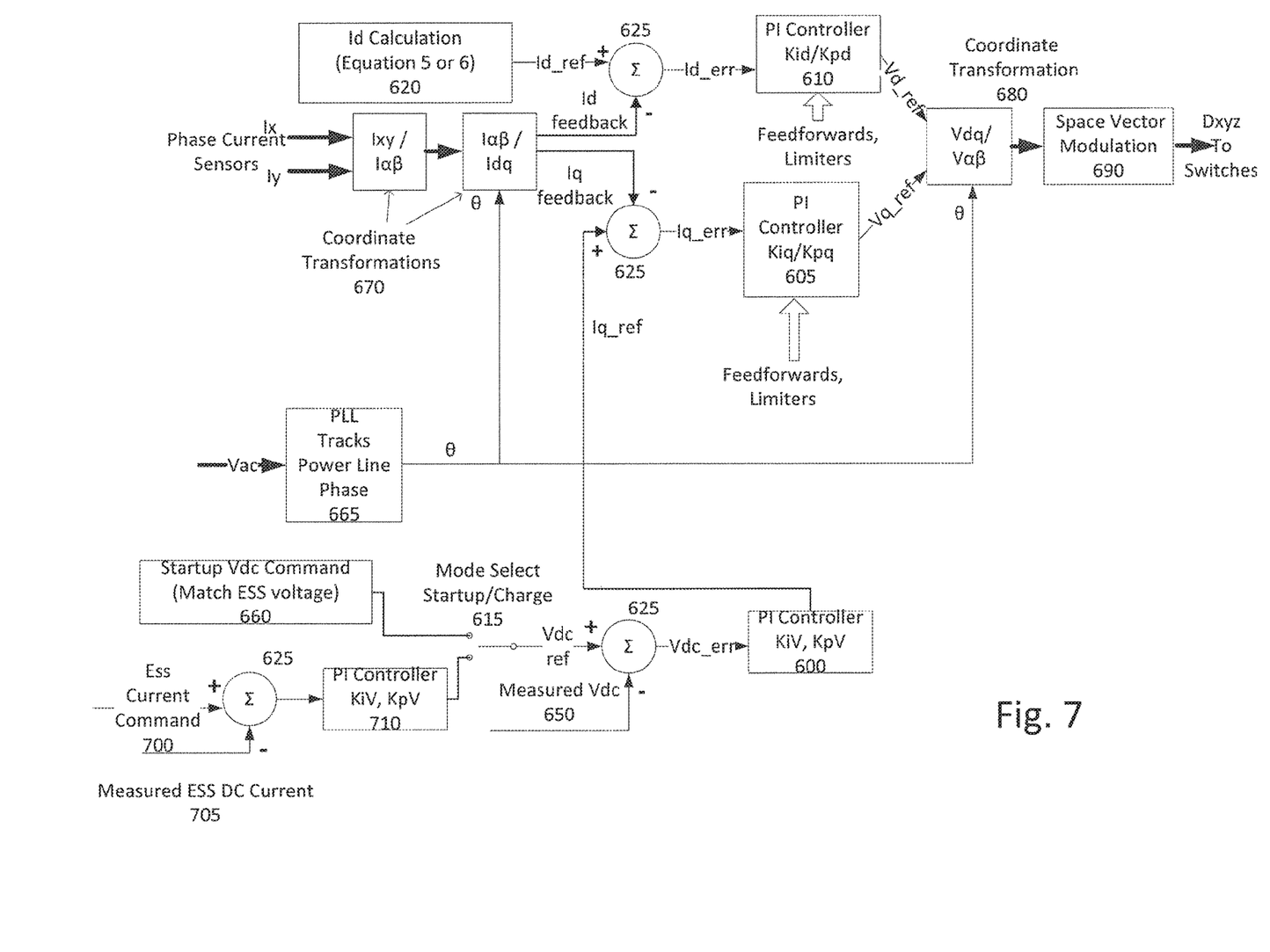
FIG. 7 is a diagram shown an example of the control for field weakening, system DC bus voltage regulation and charging the energy storage system in accordance with other aspects of the disclosure.

FIG. 7 shows another example of a control of the charging which includes an additional current control loop. For charging, the mode is set as "Charge" (615). The ESS current command 700 (Iq) is the set point. In an aspect of the disclosure, a measured DC current 705 is supplied by the ESS 20 to the processor 410 (real time current). Alternatively, in other aspects of the disclosure, the processor 410 directly measures the DC current in the ESS.

The measured DC current 705 is subtracted by the ESS current command 700 by adder 625. This generates a Iq_error. The PI Controller 710 (implemented by processor 410) outputs a value which is used as set point (e.g., Vdc_ref). A measured value (measured Vdc 650) is subtracted from Vdc ref to generate the error, e.g., Vdc_err. Similar to current, in an aspect of the disclosure, the ESS 20 may notify the processor 410 of the real time voltage or the processor 410 may directly sense the real time voltage.

The PI controller 600 outputs a Iq_Ref which causes the measured value to converge to the set point. The gains KiV and KpV are selected based on stability constraints and a desired convergence time.

As the ESS 20 is charged, the processor 410 may continue to supply the Vd command as well as the Vq command.

While the ESS 20 is charging, the processor 410 may receive the sensed voltages at the input terminals 402 from the voltage sensors 420 (S210). The processor 410 also may receive the real time voltage of the ESS 20, from the ESS 20 or directly detect the same. This allows the processor 410 to repeatedly determine whether field weakening is still needed (or can be stopped) and adjust the amount of the reactive current Id, as needed for the field weakening. S215 and S220 are repeated based on the new values.

As the voltage of the ESS 20 increases, as it is being charged, the need for field weakening decreases and therefore, the reactive current Id may be reduced.

The charging of the ESS 20 is continued until the ESS 20 is fully charged. In an aspect of the disclosure, fully charged (full charge) is a preset state of charge SOC. At S240, the processor 410 determines whether the ESS 20 is fully charged. The processor 410 receives the real time voltage from the ESS or directly measures the same. In an aspect of the disclosure, the processor 410 has stored the nominal voltage for the ESS and a preset state of charge for stopping (threshold indicating full charge). The processor 410 determines the current SOC from the received or detected voltage and compares the determined value with the preset SOC. When the determined SOC equals the preset SOC, the processor 410 stops charging the ESS 20 (at S245). Otherwise, charging continues and the process returns to S210.

Figure 3:
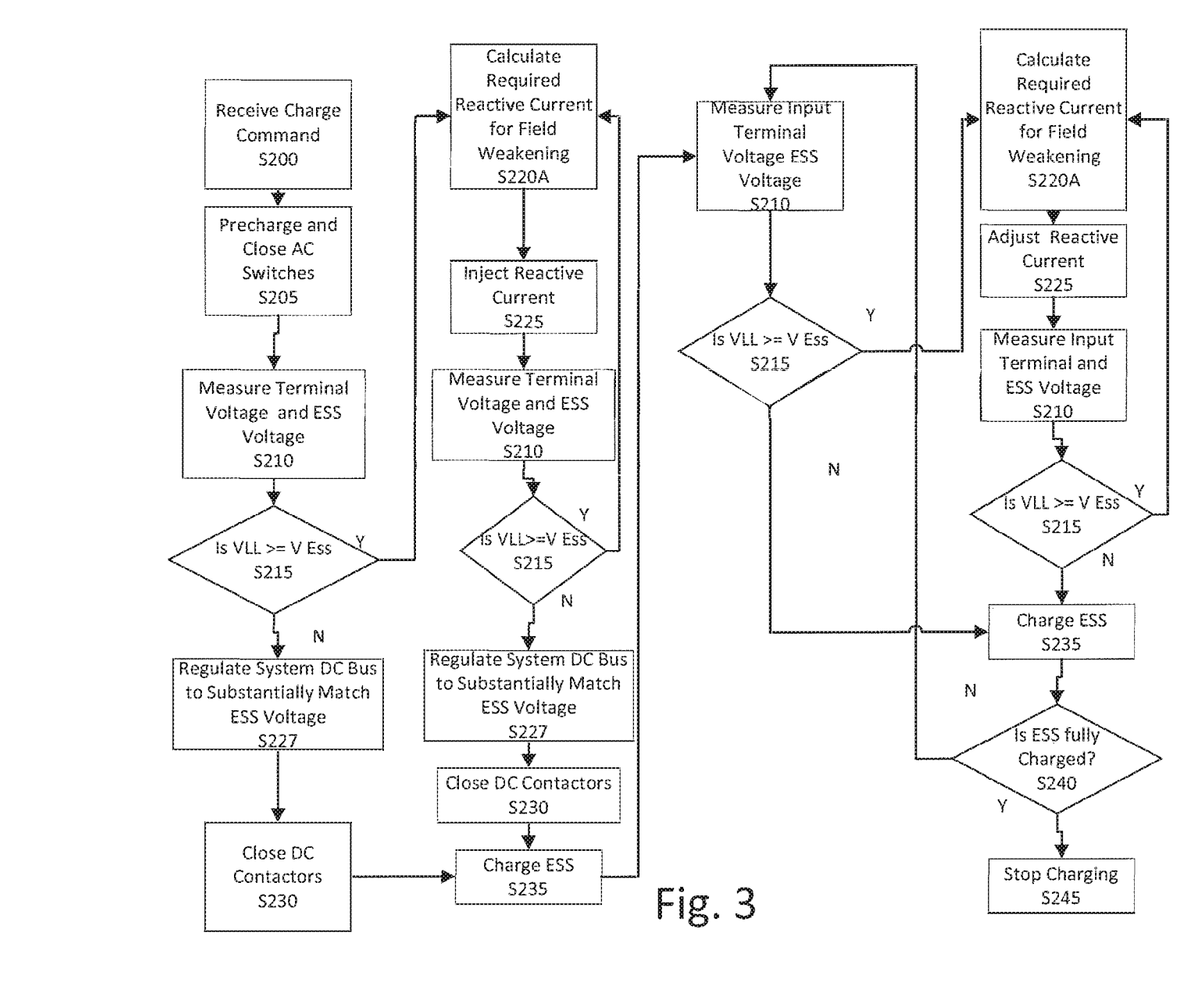
FIG. 3 is a flow diagram for charging an energy storage system using field weakening in accordance with other aspects of the disclosure.

FIG. 3 illustrates another method for controlling the charger 1 in accordance with aspects of the disclosure. Many of the functions and features illustrated in FIG. 3 are the same as FIG. 2 and will not be described again.

A difference in the control shown in FIG. 3 from the control shown in FIG. 2 is that the processor 410, executing the control in FIG. 3, implements a PI controller for determining the required reactive current Id for field weakening as opposed to calculating the reactive current Id as described above.

FIG. 5 depicts a schematic drawing of the PI controller 550 in accordance with aspects of the disclosure. In accordance with aspects of the disclosure, the PI controller 550 uses the real time voltage of the ESS (as measured) and a determined peak line-line voltage to determine the reactive current Id. Adder 500 takes the difference between the real time voltage of the ESS and a determined peak line-line voltage at the input terminals. For example, the adder 500 subtracts the real time voltage of the ESS from the determined peak line-line voltage. When the real time voltage of the ESS is larger, the difference is negative and field weakening is not required. The difference is the voltage error. In the first iteration, there is no feedback to add to the voltage error (at adder 505) and thus the command error is the difference which determines the amount of reactive current S220A. The PI controller 550 has preset gain Ki and Kp for the voltage. After the first iteration, the PI controller 500 (implemented by the processor 410) controls the conversion electronic 425 to supply the reactive current Id at S225. Subsequent iteration(s) may be performed using a real time peak line-line voltage determined from a measured terminal voltage S210 (measured at terminals 402 via voltage sensor 420) if the determined peak-line-line voltage is still above the real time voltage of the ESS ("Y" at S215). At the subsequent iterations, there is a value to add to the voltage error (via adder 505) to generate the command error. The iterations are repeated until the real time peak line-line voltage is less than the real time voltage of the ESS. Once the peak line-line voltage is less than the voltage of the ESS, the system DC bus voltage is regulated (e.g., S227), the DC contactors are closed (e.g., S230) and the ESS is charged as described above.

As described above, a voltage margin Vm may be used for the set point. Thus, a voltage margin Vm may be subtracted from the real time voltage of the ESS prior to taking the difference from the same and the peak line-line voltage.

As with the control in FIG. 2, while charging, the processor 410, implementing a PI controller 550, may adjust the reactive current Id for the field weakening based on the detected voltage of the ESS and determined peak line-line voltage from the real time voltage(s) at the terminals 402. S215, S220A and S225 are repeated until field weakening is no longer required.

In accordance with aspects of the disclosure, the converter stage 40 may inject a reactive current Id for field weakening, which reduces the peak line-line voltage at the terminals 402 when compared with no field weakening. This enables charging of the ESS even though a grid power source 100 may have a voltage (which would result in peak line-line voltage at the terminal 402) that exceeds a real-time voltage of the ESS. By field weakening, damage the energy storage system or overcharge the same may be avoided under this condition.

Advantageously, the field weakening described herein enables the use of the single stage non-isolated converter (which is also described herein). However, this disclosure is not limited to non-isolated converters and the field weakening described herein may be used for isolated converters or multi stage isolated converters.

In accordance with aspects of the disclosure, the charger 1 may be used with different types of grid power sources, even where a grid power source 100 may have a voltage (which would result in peak line-line voltage at the terminal 402) that exceeds a real-time voltage of the ESS.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually. For example, a single FPGA may be used or multiple FPGAs may be used to achieve the functions, features or instructions described herein.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A charging system for a vehicle, the charging system being coupleable to an external three-phase AC power source and for charging an energy storage system in the vehicle, the charging system comprising:
    one or more switches associated with each of the three-phases of the AC power source;
    an AC filter comprising an inductor coupled to each phase of the three-phases of the AC power source;
    conversion circuitry coupled to the inductor of each AC filter, the conversion circuitry configured to convert three-phase AC power received at its input terminals into DC power for a system DC bus and configured to supply an independently controllable real AC current and reactive AC current;
    voltage sensors for detecting a voltage at each of the three-phases at the input terminals, respectively;
    one or more switches associated with the energy storage system, where when the one or more switches associated with the energy storage system are open, the energy storage system is electrically isolated from the system DC bus;
    a processor configured to:
        close the one or more switches associated with each of the three-phases of the AC power source when a condition is satisfied;
        determine a peak line-line voltage corresponding to the detected voltage at the input terminals of the conversion circuitry; and
        compare the determined peak line-line voltage with a real time voltage of the energy storage system to be charged;
        when the determined peak line-line voltage is larger than or equal to the real time voltage of the energy storage system, the processor is configured to:
        calculate the reactive AC current to reduce the peak line-line voltage at the input terminals of the conversion circuitry to less than the real time voltage of the energy storage system;
        cause the reactive AC current to be supplied by the conversion circuitry such that it flows through each inductor, reducing the peak line-line voltage at the input terminals of the conversion circuitry;
        regulate the system DC bus to substantially match the real time voltage of the energy storage system; and
        control the one or more switches associated with the energy storage system to close once the peak line-line voltage is less than the real time voltage of the energy storage system and the system DC bus voltage substantially matches the real time voltage of the energy storage system; wherein the energy storage system is charged after the control of the one or more switches associated with the energy storage system.

2. The charging system of claim 1, wherein when the reactive AC current is calculated to reduce the peak line-line voltage at the input terminals of the conversion circuitry to less than the real time voltage of the energy storage system, the reactive AC current is calculated such that the peak line-line voltage is a predetermined value less than the real time voltage of the energy storage system.

3. The charging system of claim 2, wherein the predetermined value is based on deadtime, switch drop and controls.

4. The charging system of claim 2, wherein the reactive AC current is calculated based on the following equation:

$$Id = \frac{-Vac}{\omega eLs} + \sqrt{\frac{(Vess - Vm)^2}{3Ls^2\omega e^2} - Iq^2},$$

where Vac is a peak-line neutral voltage of the three-phase power source, ωe is the frequency of the three-phase power source, Ls is the inductance of inductor, Vess is the real time voltage of the energy storage system and Vm is the voltage margin, Id is the reactive AC current and Iq is the real AC current.

5. The charging system of claim 1, wherein the processor is configured to detect the real time voltage of the energy storage system as the energy storage system is charging or receive a voltage value from the energy storage system and continuously adjust the reactive AC current based on the real time voltage of the energy storage system.

6. The charging system of claim 5, wherein the processor is configured to detect the real voltage of the energy storage system as the energy storage system is charging or receive a voltage value from the energy storage system and continuously adjust the reactive AC current based on a difference between the peak line-line voltage at each input terminal of the conversion circuitry and the real time voltage of the energy storage system as the energy storage system charges.

7. The charging system of claim 1, wherein the determination of the peak line-line voltage, comparison with the real time voltage of the energy storage system and calculation of the reactive AC current is repeatedly performed prior to closing the one or more switches associated with the energy storage system, until the determined peak line-line voltage at the input terminals of the conversion circuitry is less than the real time voltage of the energy storage system.

8. The charging system of claim 1, wherein the condition comprises receiving a signal from another controller or the energy storage system to charge the energy storage system.

9. The charging system of claim 8, wherein the processor is further configure to open the one or more switches associated with the energy storage system when receiving the signal from another controller or the energy storage system to charge the energy storage system to isolate the energy storage system from the system DC bus.

10. The charging system of claim 1, wherein the processor is configured to control the one or more switches associated with the energy storage system to close without causing the reactive AC current to be supplied by the conversion circuitry when it is determined that the peak line-line voltage at the input terminals of the conversion circuitry is less than the real time voltage of the energy storage system.

11. The charging system of claim 1, wherein the conversion circuitry is a boost rectifier.

12. The charging system of claim 1, wherein the one or more switches associated with the energy storage system is located between the system DC bus and the energy storage system.

13. The charging system of claim 1, wherein the processor is configured to control at least one of the real AC current and real voltage Vq to regulate the system DC bus to substantially match the voltage of the energy storage system prior to closing the one or more switches associated with the energy storage system.

14. The charging system of claim 1, wherein the processor is configured to control the real AC current to charge the energy storage system.

15. The charging system of claim 1, wherein the processor is configured to regulate the system DC bus voltage to charge the energy storage system.

16. The charging system of claim 1, wherein the vehicle is a hybrid electric vehicle.

17. The charging system of claim 1, wherein the vehicle is an electric vehicle.

18. The charging system of claim 1, wherein the processor is configured to cause the reactive AC current by injecting the reactive AC current through each inductor of each AC filter causing field weakening.

* * * * *